United States Patent [19]

Reinecke et al.

[11] 4,342,254
[45] Aug. 3, 1982

[54] CIRCUIT FOR HYDROSTATICALLY OPERABLE DEVICES

[75] Inventors: Udo Reinecke, Dortmund-Kirchhörde; Jürgen Gerber, Ergste, both of Fed. Rep. of Germany

[73] Assignee: O & K Orenstein & Koppel Aktiengesellschaft, Berlin, Fed. Rep. of Germany

[21] Appl. No.: 136,084

[22] Filed: Mar. 31, 1980

Related U.S. Application Data

[63] Continuation of Ser. No. 880,839, Feb. 23, 1978, abandoned, which is a continuation of Ser. No. 671,157, Mar. 29, 1976, abandoned, which is a continuation of Ser. No. 535,824, Dec. 23, 1974, abandoned.

[30] Foreign Application Priority Data

Dec. 22, 1973 [DE] Fed. Rep. of Germany ....... 2364282

[51] Int. Cl.³ .................... F01B 25/02; F15B 11/00
[52] U.S. Cl. ............................. 91/6; 91/510; 91/530; 137/596.13
[58] Field of Search ............. 91/6, 510, 530, 531; 60/484, 486, 468, 494; 137/596.13, 625.69

[56] References Cited

U.S. PATENT DOCUMENTS

| | | |
|---|---|---|
| 3,478,647 | 11/1969 | Gerber . |
| 3,543,646 | 12/1970 | Iijima . |
| 3,720,059 | 3/1973 | Schurawski .................. 60/421 |
| 3,800,669 | 4/1974 | Distler ........................... 60/421 |
| 3,922,855 | 12/1975 | Bridwell ........................ 91/531 |

FOREIGN PATENT DOCUMENTS 1426590 3/1969 Fed. Rep. of Germany ........ 91/530

*Primary Examiner*—Abraham Hershkovitz
*Attorney, Agent, or Firm*—Becker & Becker, Inc.

[57] ABSTRACT

A circuit for hydrostatically operable devices, especially hydraulic dredges, with at least two working circuits each of which comprises a plurality of hydraulic cylinders and/or hydraulic motors as well as a hydraulic pump while, depending on the requirement, the delivery of the pertaining hydraulic pump is conveyed to each hydraulic cylinder or hydraulic motor and while by means of a plurality of tie lines the deliveries of the remaining hydraulic pumps are selectively conveyed to one of two or more selected hydraulic cylinders or hydraulic motors. The deliveries of the hydraulic pumps flow to the tank after having passed through the control valves associated with the hydraulic cylinders and controlling each of the hydraulic pumps. The control members for each of the circuits of the pumps involved comprise circulating passages which are passed through in opposite directions while the circulating passages of one pump are through conduits and the circulating passages of the other pump are likewise through conduits connected to each other and are further by means of conduits connected to the tank. The circuit is furthermore characterized in that from the connecting conduits there branch off lines which through check valves are connected to the pressure connection of the respective control valve. The circuit is furthermore characterized in that when the control members are actuated so as to move out of their zero position both circulating passages are blocked.

1 Claim, 4 Drawing Figures

CIRCUIT FOR HYDROSTATICALLY OPERABLE DEVICES

This is a Continuation of co-pending application Ser. No. 880,839-Reinecke et al filed Feb. 23, 1978, now abandoned, which in turn is a Continuation of Ser. No. 671,157-Reinecke et al filed Mar. 29, 1976, now abandoned, which in turn was a Continuation of parent application Ser. No. 535,824-Reinecke et al filed Dec. 23, 1974 (Monday) also now abandoned.

The present invention relates to a circuit for hydrostatically operable device, especially hydraulic dredges, with two or more working circuits, each of which comprises a plurality of hydraulic cylinders and/or motors and a hydraulic pump while, depending on the requirement, the delivery of the pertaining hydraulic pump is conveyed to each hydraulic cylinder and/or hydraulic motor and while, by means of a plurality of tie lines the quantities of the remaining hydraulic pumps are selectively conveyed to one of two or more selected hydraulic cylinders or motors, the deliveries of the hydraulic pumps flowing to the tank after having passed through the control members associated with the hydraulic cylinders and controlling each of the hydraulic pumps.

With the heretofore known circuit for hydraulic dredges, the delivery of two pumps is individually or together conveyed to two selected hydraulic cylinders or motors. This system is not suitable to convey the delivery of the two pumps to two hydraulic cylinders selected at random.

It is an object of the invention to overcome the drawback of the above mentioned arrangement and to provide a hydraulic system in which a random selected hydraulic cylinder or motor is acted upon by hydraulic oil from two pump circuits, or in which of any random number of hydraulic cylinders or motors for each hydraulic circuit one consumer is fully acted upon.

These and other objects and advantages of the invention will appear more clearly from the following specification, in connection with the accompanying drawings, in which.

The circuit according to the present invention is characterized primarily in that the control members for each of the circuits of the pumps involved comprise circulating passages which are passed through in opposite directions while said circulating passages of one pump are through conduits and the circulating passages of the other pump are likewise through conduits connected to each other and are further, by means of conduits, connected to the tank. The said circuit is furthermore characterized in that from the connecting conduits there branch off lines which through check valves are connected to the pressure connection of the respective control valve. The circuit is still further characterized in that when the control members are actuated out of their zero position, both circulating passages are blocked.

Figure 1:
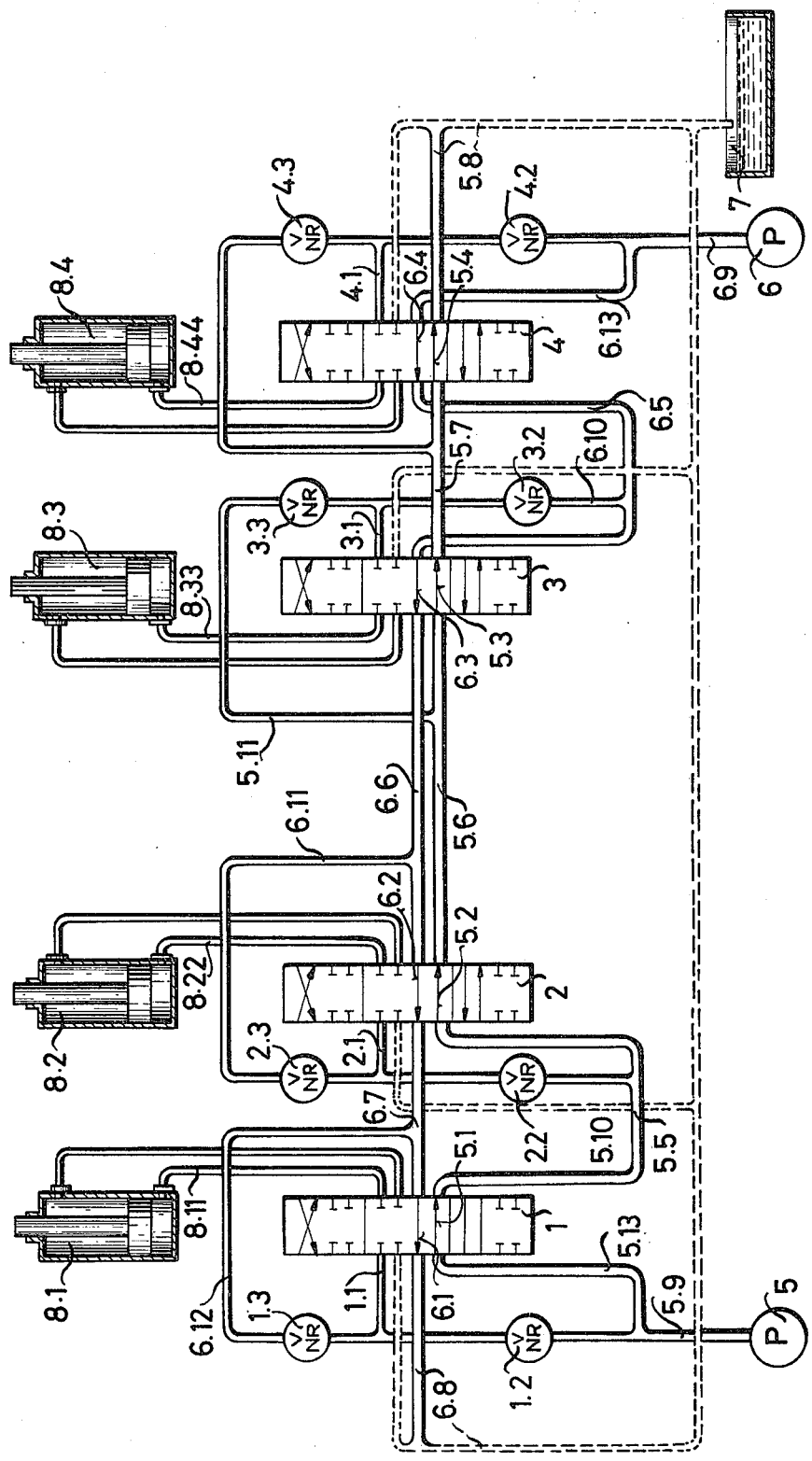
FIG. 1 illustrates a hydraulic circuit according to the invention showing all control valves in neutral position.
Figure 2:
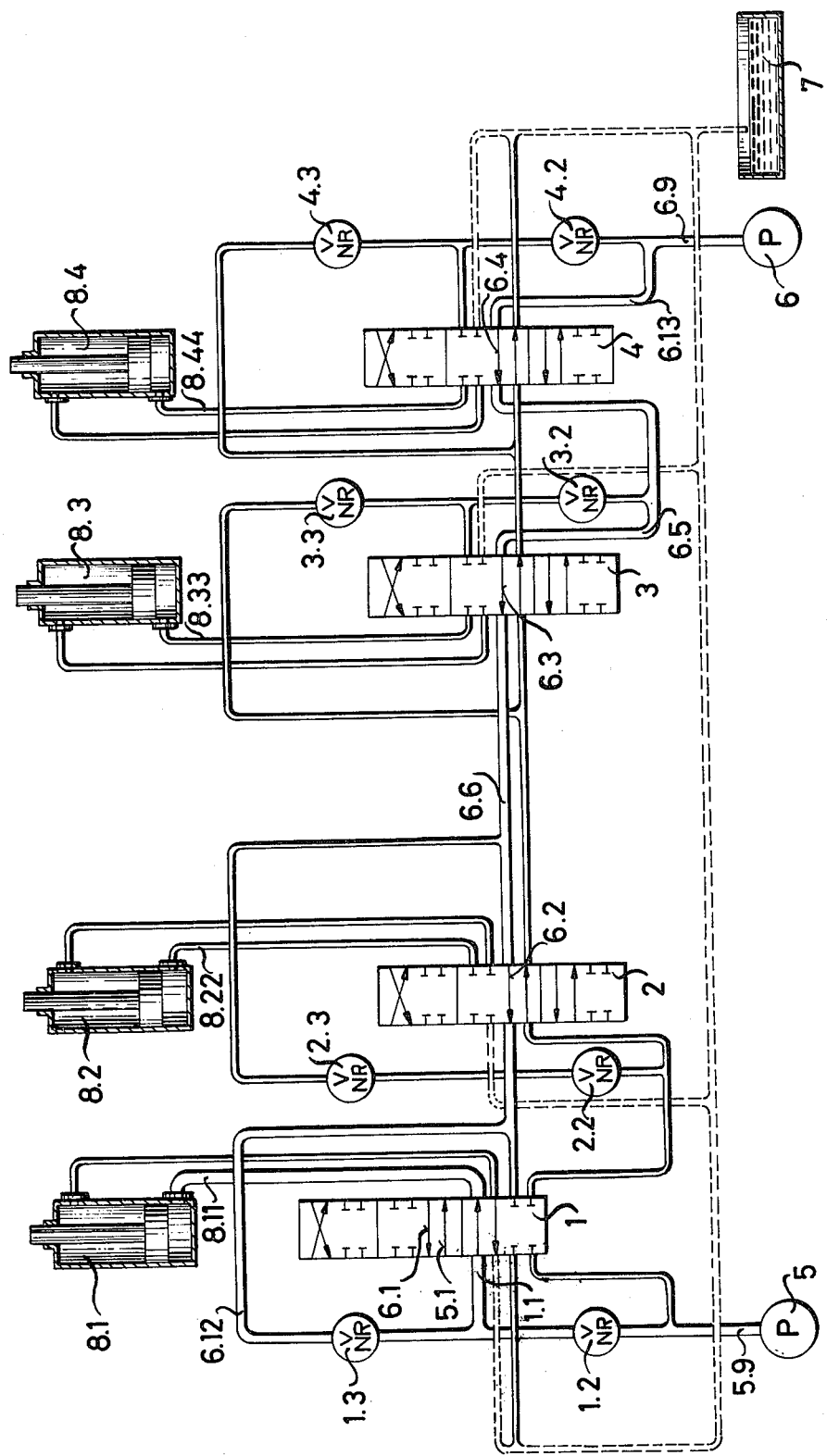
FIG. 2 shows the circuit of FIG. 1, however, with a duplex action upon a consumer.

Referring now to the drawings in detail, the control valves 1, 2, 3 and 4, are shown in their neutral position. A pump 5 delivers fluid to the hydraulic tank through conduits 5.9 and 5.13, the circulating passage 5.1, the connecting line 5.5, the circulating passage 5.2, the connecting line 5.6, the circulating passage 5.3, the connecting line 5.7, the circulating passage 5.4, and the tank line 5.8. At the same time, the pump 6 likewise delivers fluid to the hydraulic tank 7 through conduits 6.9 and 6.13, the circulating passage 6.4, the connecting line 6.5, the circulating passage 6.3, the connecting line 6.6, the circulating passage 6.2, the connecting line 6.7, the circulating passage 6.1, and the tank line 6.8. If now, for instance, the consumer 8.1 is to be acted upon on two sides (FIG. 2), the neutral valve 1 is moved out of its central position to an actuating position, in which the circulating passages 5.1 and 6.1 are blocked so that the delivery of pump 5 flows to the consumer 8.1 through conduit 5.9, check valves 1.2, pressure connection 1.1, and conduit 8.2. At the same time, pump 6 likewise delivers fluid to the consumer 8.1 through conduit 6.9, conduit 6.13, circulating passage 6.4, connecting line 6.5, circulating passage 6.3, connecting line 6.6, circulating passage 6.2, connecting line 6.7, circulating passage 6.1, conduit 6.12, check valve 1.3, and conduit 8.11. The consumer 8.1 may, for instance, be a hydraulic cylinder for acting upon the digging movement of a deep shovel into which material is being loaded. Thus, double action upon a consumer, in this instance, the working cylinder 8.1 is effected.

Figure 3:
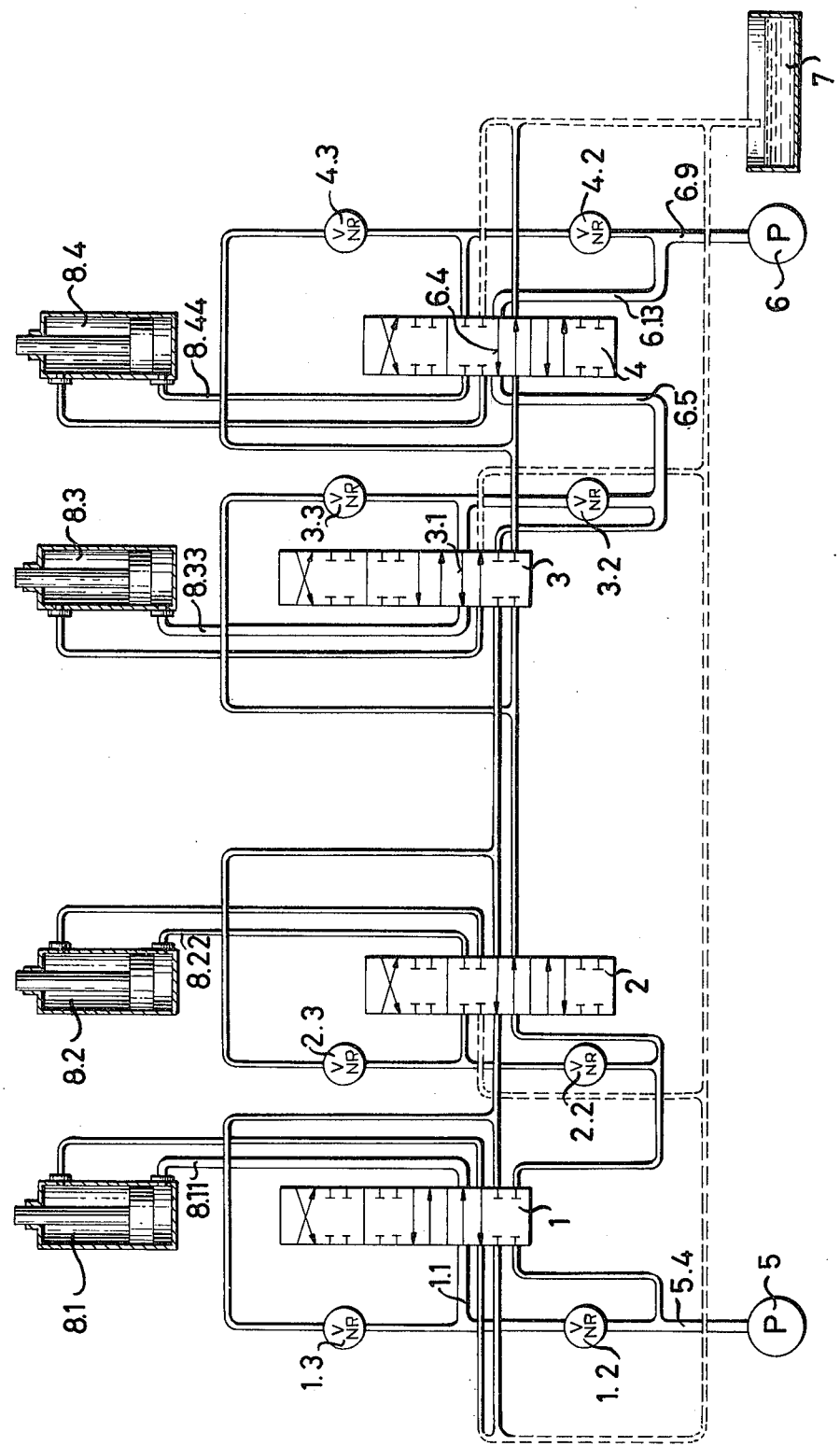
FIG. 3 shows a circuit with two consumers and simple complete action thereupon.

When the operator for carrying out another operation has to act upon two hydraulic cylinders, in other words, two consumers, for instance, in addition to the consumer 8.1, has to actuate the hydraulic cylinder 8.3, the operator moves the control valve 3 into the position of FIG. 3. In this way, the pump 6 is separated from the consumer 8.1 so that the consumer 8.1 as well as the consumer 8.3 received oil from one pump each. As will be evident from FIG. 3, the oil under pressure delivered by the pump 6 passes first, as described above, via conduit 6.9, circulating passage 6.4 of control valve 4, connecting line 6.5, and then through check valve 3.2, pressure connection 3.1 and conduit 8.33 to the consumer 8.3 (piston side). The consumer 8.1 will at the same position of the control valve 1, as before receive the oil under pressure via the above described path, however, in this instance only a simple action is effected for two consumers.

Figure 4:
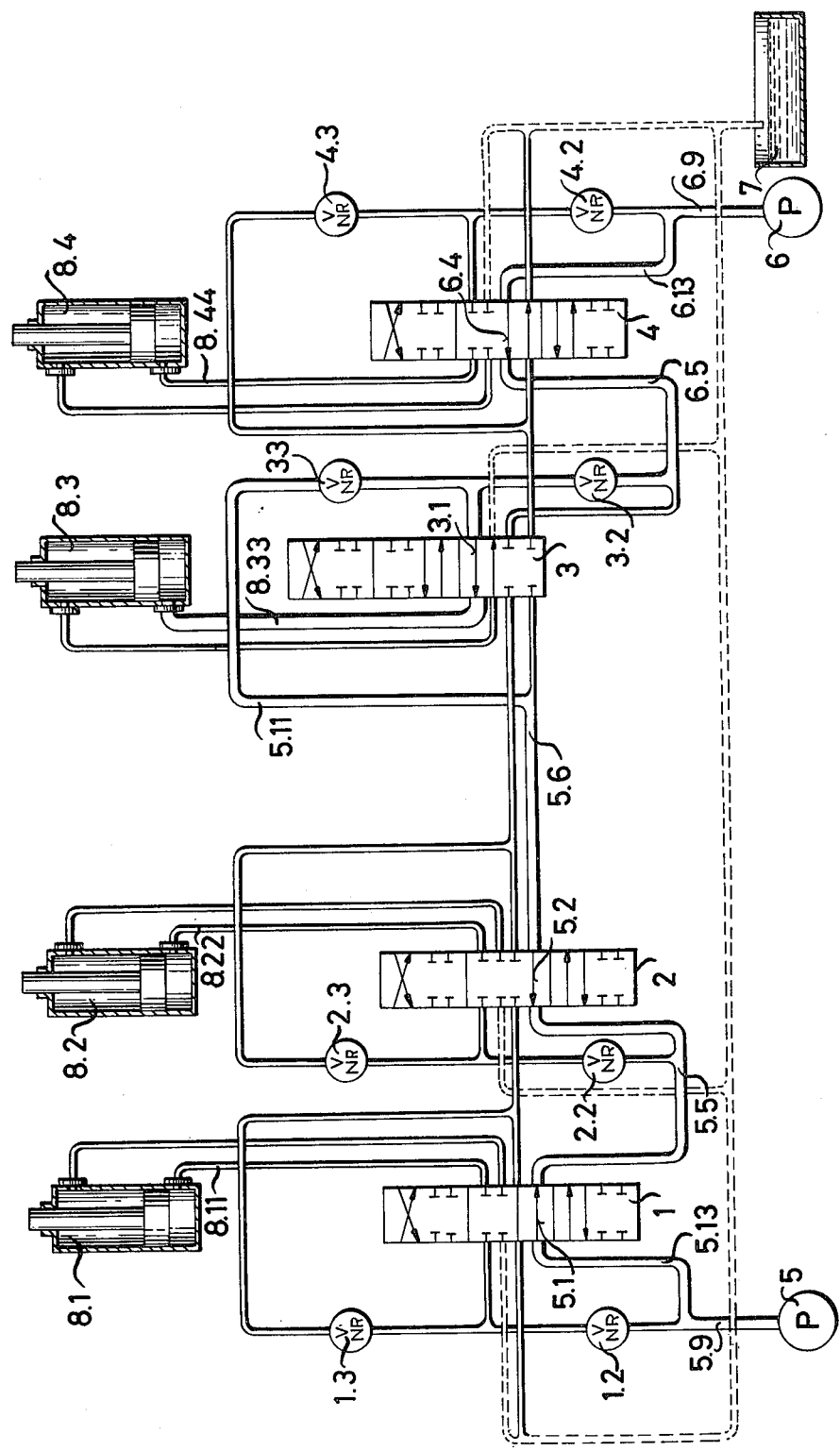
FIG. 4 illustrates a circuit with automatic duplex action after one of the valves acted upon in conformity with FIG. 3 has been disconnected.

If now, for the consumer 8.3, which is acted upon one side, for purposes of a double action twice the quantity of oil under pressure is required, the operator shifts the control valve 1 to neutral position and the oil under pressure delivered by the pump 5 will then pass through the path shown in FIG. 4. In other words, the oil delivered by pump 5 passes through conduits 5.9 and 5.13, the circulating passage 5.1, the connecting line 5.5, the circulating passage 5.2, the connecting line 5.6, the branch line 5.11, the the check valve 3.3, the pressure connection 3.1, and line 8.33 to the consumer 8.3, which is now doubly acted upon. Thus, as will be evident from the above, the circuit according to the invention makes it possible to act upon each selected consumer by double action or to act upon two randomly selected consumers by single action.

It is, of course, to be understood that the present invention is, by no means limited to the specific showing in the drawings, but also comprises any modifications within the scope of the appended claims.

What we claim is:

1. A hydraulic system for actuation of working devices on construction machines including lifting and lowering movements of excavating scoops with which a plurality of hydraulic devices are operated by fluid pressure delivered by fluid flow from a hydraulic tank by two pumps, each hydraulic device being operable by pressure from both pumps or each of any two devices being operable independently by pressure from one of said pumps, said system comprising in combination two hydraulic circuits having opposite ends including discharge ends as well as fluid circulating passages thereto and having two pumps connected to opposite ends of said hydraulic circuits to provide fluid flow from the tank under pressure through circulating passages to the discharge ends at the opposite ends of said hydraulic circuits, said two pumps including a first pump connected to one end of one hydraulic circuit and a second pump connected to the opposite end of the other hydraulic circuit to produce fluid flow in opposite directions through circulating passages in said hydraulic circuits to discharge outlets at the ends of said hydraulic circuits, a plurality of hydraulic devices operable by fluid pressure connected in parallel to said fluid circulating passages to receive fluid pressure from said passages, and conduits connecting both said circulating passages to each of said hydraulic devices to receive fluid pressure from said circulating passages, so that each hydraulic device may be operated by fluid under pressure from the two circulating passages, each hydraulic device being connected to two fluid circulating passages through check valves each having a pressure connection therewith and which allow passage of fluid to said hydraulic device to operate said device, a plurality of control valve devices, each of which controls the connection of one of said hydraulic devices to said fluid circulating passages for the flow through the conduit to one of said hydraulic devices and is movable from neutral position to actuating position to connect the corresponding hydraulic device through its conduit to said fluid circulating passages, each control valve device having fluid circulating passages for fluid flow through said circuits when said control valve device is in neutral position, so that said fluid circulating passages are continuous from the pumps to the discharge ends when all control valve devices are in neutral position, each control valve device when moved to actuating position connecting the two circulating passages to the corresponding hydraulic device through its conduit to operate said hydraulic device corresponding therewith, each control valve device in actuating position closing the two circulating passages through said hydraulic circuits, so that the circulating passage on the downstream side of the control valve device is blocked by the control valve device in actuating position, and the hydraulic devices on the downstream side of said control valve device receive no fluid pressure from that hydraulic circuit, and the movement of any two control valve devices to their actuating positions serving to connect each of the corresponding hydraulic devices to one of said circulating passages, said first and second pumps each having fluid flow discharging to the hydraulic tank after flowing through said check valves so that fluid flow in the operatively ineffective position occurs through two conduits or circulating passages capable of being closed off by said control valve device therewith in operatively effective position, each conduit having fluid flow therethrough amounting to capacity and conveying quantity of one pump associated therewith permanently in a relationship oppositely with respect to the relationship to the feed conveying direction of the other pump, each conduit under consideration upstream of each control valve device having a conduit branching to the pressure connection of the check valve open toward the control valve device associated therewith.

* * * * *